(12) United States Patent
Wolfe et al.

(10) Patent No.: US 6,907,455 B1
(45) Date of Patent: Jun. 14, 2005

(54) APPARATUS AND METHODS FOR PROVIDING AN EVENT DRIVEN NOTIFICATION OVER A NETWORK TO A TELEPHONY DEVICE

(75) Inventors: William M. Wolfe, Santa Monica, CA (US); Ryan A. Danner, Glen Allen, VA (US); Steven J. Martin, Richmond, VA (US)

(73) Assignee: Cisco Technology, Inc., San Jose, CA (US)

( * ) Notice: Subject to any disclaimer, the term of this patent is extended or adjusted under 35 U.S.C. 154(b) by 831 days.

(21) Appl. No.: 09/606,727

(22) Filed: Jun. 29, 2000

(51) Int. Cl.[7] .............................................. G06F 15/16
(52) U.S. Cl. ..................... 709/217; 704/275; 704/260
(58) Field of Search .............................. 709/202, 224, 709/229, 217, 223, 220; 707/200, 4; 370/275, 352; 704/275, 360; 701/300; 340/825; 375/219; 74/1

(56) References Cited

U.S. PATENT DOCUMENTS

| | | | | |
|---|---|---|---|---|
| 4,837,798 A | | 6/1989 | Cohen et al. ................ | 379/88 |
| 6,049,819 A | * | 4/2000 | Buckle et al. .............. | 709/202 |
| 6,167,448 A | * | 12/2000 | Hemphill et al. .......... | 709/224 |
| 6,327,535 B1 | * | 12/2001 | Evans et al. ................ | 701/300 |
| 6,389,472 B1 | * | 5/2002 | Hughes et al. ............. | 709/229 |
| 6,490,564 B1 | * | 12/2002 | Dodrill et al. ............. | 704/275 |
| 6,516,337 B1 | * | 2/2003 | Tripp et al. ................. | 709/202 |
| 6,549,916 B1 | * | 4/2003 | Sedlar ........................ | 707/200 |
| 6,600,736 B1 | * | 7/2003 | Ball et al. ................... | 370/352 |

OTHER PUBLICATIONS

West: A Web Browser for Small Terminals—Björk, al. (1999) ; www.viktoria.informatik.gu.se/groups/play/publications/1999/west. pdf.*

IJoseph95 1—Rover Toolkit For ; www–2.cs.cmu.edu/afs/cs.cmu.edu/user/satya/Web/MCSALINK/PAPERS/joseph95.pdf.*

Systems Development with Java: Experiences from a Practical..—Bergner, Huber (1997) ; www4.informatik.tu–muenchen.de/papers/step97__huberf__1997 __Conference.ps.gz.*

* cited by examiner

Primary Examiner—Thong Vu
(74) Attorney, Agent, or Firm—Barry W. Chapin, Esq.; Chapin & Huang, LLC

(57) ABSTRACT

The invention is directed to techniques for notifying a client device of the occurrence of an event using a web application activated based on an application-state data record. A persistent process monitors incoming data for the occurrence of an event and provides the application-state data record that can be used to activate a session of an event notification application. The persistent process provides an event indicator to a proxy browser which then activates the event notification application. The event notification application provides an event notification to the proxy browser, which in turn provides an audio notification of the event to the client device, which may be a telephony device or other two-way audio communication device. The user of the client device can then respond to the event notification or otherwise interact with the event notification application via the proxy browser.

29 Claims, 11 Drawing Sheets

500

```
<?xml version="1.0" standalone="yes"?>
<BROWNIE>
    <MenuVariables name="XML_State" value="SHIPPING_NOTIFY_SETUP_CALL.xml"/>   520
    <MenuVariables name="Target_PhoneNumber" value="8885550000"/>
    <MenuVariables name="Shipping_Time" value="15"/>
    <MenuVariables name="Shipment_Num" value="1442Z4E6"/>
</BROWNIE>
```

502 — `<MenuVariables name="XML_State" ...>`
504 — `<MenuVariables name="Target_PhoneNumber" ...>`
506 — `<MenuVariables name="Shipping_Time" ...>`
508 — `<MenuVariables name="Shipment_Num" ...>`

FIG. 8A

```xml
<?xml version="1.0" standalone ="yes"?>
<DOCUMENT>
<MenuVariables name="MenuName"  value="SHIPPING_NOTIFY_SETUP_CALL"/>
<MenuVariables name="Fallback"  value="LOG_DETERMINE_ACCESS_TYPE_MENU.xml"/>
<MenuVariables name="Type"  value="DECISION"/>
<Options name="Action"  value="call_setup(B|Target_PhoneNumber)"  text=""/>
<Options name="0"  value="MENU:ERROR_LOGOUT.xml"  text=""/>
<Options name="1"  value="MENU:SHIPPING_OUTCALL_PENDING.xml"  text=""/>
</DOCUMENT>
```

```
<?xml version="1.0" standalone ="yes"?>
<DOCUMENT>
<MenuVariables name="MenuName"  value="SHIPPING_OUTCALL_PENDING"/>

<MenuVariables name="Fallback"  value="LOG_DETERMINE_ACCESS_TYPE_MENU.xml"/>

<MenuVariables name="Type"  value="MENU"/>

<Options name="MAKECALL_NO" value="MENU:ERROR_LOGOUT.xml"
text=""/>
<Options name="MAKECALL_OK" value="MENU:SHIPPING_PLAY_INFORMATION.xml"
text=""/>
<Options name="TIMEOUT" value="MENU:ERROR_LOGOUT.xml"
text=""/>
</DOCUMENT>
```

```xml
<?xml version="1.0" standalone="yes"?>
<DOCUMENT>
<MenuVariables name="MenuName"    value="Package Tracking Main Menu"/>
<MenuVariables name="DefaultPrompt" value="SHIP_ACTIONS_PROMPT.wav"/>
<MenuVariables name="Components" value=""/>
<MenuVariables name="Conditions"  value="shipping_playinfo(B|Shipment_Num,B|Shipping_Time)"/>
<MenuVariables name="Fallback"   value="AUD_MAIN_MENU.xml"/>
<MenuVariables name="Type" value="MENU"/>
<MenuVariables name="InputMask" value="StandardMenu"/>
<MenuVariables name="Images"   value=""/>
<MenuVariables name="Text"   value="To inquire about another shipment, press 1. To set up how you want to be notified, press 2."/>
<Options name="0"  value="SOUND:MAIN_HELP.wav" text=""/>
<Options name="1"  value="MENU:GET_SHIPPING_NUMBER.xml" text="Inquire about another shipment."/>
<Options name="2"  value="MENU:SHIPPING_SETUP_ACCOUNT.xml" text="Set up shipping notification."/>
<Options name="*9"  value="DECISION:LOGOUT_GOODBYE.xml" text=""/>
</DOCUMENT>
```

FIG. 8D

APPARATUS AND METHODS FOR PROVIDING AN EVENT DRIVEN NOTIFICATION OVER A NETWORK TO A TELEPHONY DEVICE

BACKGROUND

The evolution of the conventional public switched telephone network has resulted in a variety of voice applications and services that can be provided to individual subscribers and business subscribers. Such services include voice messaging systems that enable landline or wireless subscribers to record, playback, and forward voice mail messages. However, the ability to provide enhanced services to subscribers of the public switched telephone network is directly affected by the limitations of the public switched telephone network. In particular, the public switched telephone network operates according to a protocol that is specifically designed for the transport of voice signals; hence any modifications necessary to provide enhanced services can only be done by switch vendors that have sufficient know-how of the existing public switched telephone network infrastructure.

An open standards-based Internet protocol (IP) network, such as the World Wide Web, the Internet, or a corporate intranet, provides client-server type application services for clients by enabling the clients to request application services from remote servers using standardized protocols, for example, the hypertext transport protocol (HTTP). The web server application environment can include web server software, such as Apache, implemented on a computer system attached to the IP network. Web-based applications are composed of HTML (Hypertext Markup Language) pages, logic, and database functions. In addition, the web server may provide logging and monitoring capabilities.

In contrast to the public switched telephone network, the open standards-based IP network has enabled the proliferation of web based applications written by web application developers using web development tools. Hence, the ever increasing popularity of conventional web applications and web development tools provides substantial resources for application developers to develop robust web applications in a relatively short time and in an economical manner. However, one important distinction between telephony-based applications and web-based applications is that telephony-based applications are state aware, whereas web-based applications are stateless.

In particular, conventional telephony applications are state aware to ensure that prescribed operations between the telephony application servers and the user telephony devices occur in a prescribed sequence. For example, operations such as call processing operations, voicemail operations, call forwarding, etc., require that specific actions occur in a specific sequence to enable the multiple components of the public switched telephone network to complete the prescribed operations.

The prior art web-based applications running in the IP network, however, are state-less and transient in nature, and do not maintain application state because application state requires an interactive communication between the browser and back-end database servers accessed by the browsers via a HTTP-based web server. However, an HTTP server provides asynchronous execution of HTML applications, where the web applications in response to reception of a specific request in the form of a URL (Uniform Resource Locator) from a client, instantiate a program configured for execution of the specific request, send an HTML web page back to the client, and terminate the program instance that executed the specific request. Storage of application state information in the form of a "cookie" is not practical because some users prefer not to enable cookies on their browser, and because the passing of a large amount of state information as would normally be required for voice-type applications between the browser and the web application would substantially reduce the bandwidth available for the client.

Referring now to conventional approaches used to track and monitor events of significance to a user of some service, in one approach the user actively checks or monitors data to determine if some event occurred of significance to the user. For example, the user opens a web browser and accesses a web site to check on when packages are likely to be delivered to or picked up from the user's office, or whether a user's overnight delivery package has been delivered to an intended recipient. The user can use the packages identification number or other information to check the web site to determine when and where the package was delivered. The user can also use the web site, or call the overnight deliver service provider, to determine when a package will be picked up for outgoing delivery.

In another conventional approach, a user can be contacted by an individual calling the user over a telephone. For example, a stock broker can initiate a phone call to the user when a stock has reached a low price level to discuss with the user whether to buy the stock or not.

In another example, the user accesses a web site to check on a current stock quote price. For example, a user can access a commercial web site, such as the Yahoo!™, currently located at www.yahoo.com, provided by Yahoo! Inc., Santa Clara, Calif. The user can request a stock quote. The web site then locates the latest stock quote for the stock in question, and presents it to the user via a web page provided to the user and displayed on the user's local browser. The user then decides whether to purchase the stock, either through a link associated with the web site, or by contacting a stock broker independently from the web site, such as by contacting the stock broker by telephone.

SUMMARY OF THE INVENTION

The following paragraphs summarize related applications suitable for use in implementing the invention.

Commonly-assigned, copending application Ser. No. 09/480,485, filed Jan. 11, 2000, entitled "Application Server Configured for Dynamically Generating Web Pages for Voice Enabled Web Applications", the disclosure of which is incorporated in its entirety herein by reference, discloses an application server that executes a voice-enabled web application by runtime execution of extensible markup language (XML) documents that define the voice-enabled web application to be executed. The application server includes a runtime environment that establishes an efficient, high-speed connection to a web server. The application server, in response to receiving a user request from a user, accesses an XML page that defines at least a part of the voice application to be executed for the user. The XML page may describe a user interface, such as dynamic generation of a menu of options or a prompt for a password, an application logic operation, or a function capability such as generating a function call to an external resource. The application server then parses the XML page, and executes the operation described by the XML page, for example, by dynamically generating an HTML page having voice application control content, or fetching another XML page to continue application processing. In addition, the application server may access an XML page that stores application state information, enabling the application server to be state-aware relative to the user interaction. Hence, the XML page, which can be written using a conventional editor or word processor, defines the application to be executed by the application server within the runtime environment, enabling voice enabled web applications to be generated and executed without the necessity of programming language environments. Hence, web programmers can write voice-enabled web applications, using the teachings of the above-incorporated application Ser. No. 09/480,485, by writing XML pages that specify respective voice application operations to be performed. The XML documents have a distinct feature of having tags that allow a web browser (or other software) to identify information as being a specific kind or type of information.

Commonly assigned, copending application Ser. No. 09/501,516, filed Feb. 1, 2000, entitled "Arrangement for Defining and Processing Voice Enabled Web Applications Using Extensible Markup Language Documents", the disclosure of which is incorporated in its entirety herein by reference, discloses an arrangement for defining a voice-enabled web application using extensible markup language (XML) documents that define the voice application operations to be performed within the voice application. Each voice application operation can be defined as any one of a user interface operation, a logic operation, or a function operation. Each XML document includes XML tags that specify the user interface operation, the logic operation and/or the function operation to be performed within a corresponding voice application operation, the XML tags being based on prescribed rule sets that specify the executable functions to be performed by the application runtime environment. Each XML document may also reference another XML document to be executed based on the relative position of the XML document within the sequence of voice application operations to be performed. The XML documents are stored for execution of the voice application by an application server in an application runtime environment. Hence, the XML document described in the above-incorporated application Ser. No. 09/501,516, which can be written using a conventional editor or word processor, defines the application to be executed by the application server within the runtime environment, enabling voice enabled web applications to be generated and executed without the necessity of programming language environments.

Commonly assigned, copending application Ser. No. 09/461,191, filed Dec. 15, 1999, entitled "Apparatus and Method for Providing Server State and Attribute Management for Voice Enabled Web Applications" the disclosure of which is incorporated in its entirety herein by reference, discloses an arrangement for providing the application server state and managing application attributes for a voice enabled web application. An application server configured for executing voice-enabled web applications for a web browser generates and maintains a server-side data record that includes application state information and user attribute information for an identified user session with a web browser. The application server, in response to receiving a new web page request from a browser, upon verifying that a new session with the user is required, creates a transient application session and executes a web application instance to complete the request, and generates the server-side data record including application state information for the application session and user attribute information for the user of the application session. The server-side data record also includes a session identifier that uniquely identifies the session with the user of the application session. The application server stores the server-side data record in a memory resident within the server side of the network, and sends to the browser the session identifier and the corresponding web page requested by the web browser. In response to receiving a second web page request from the browser that includes the session identifier, the application server executes a new web application instance, and recovers the server-side data record from the memory based on the session identifier included in the second page request. Hence, the application server is able to resume processing relative to the prior application state and user attributes specified in the server-side data record, providing a state-full session for the user without the passing of the application state and the user attributes to the browser as cookies.

The present invention is directed to an improved approach for providing notification of the occurrence of an event. There are a number of deficiencies with conventional event tracking systems and approaches. Users of a service, such as an overnight delivery service, may be required to initiate action, such as making a phone call or checking a web site, when they often desire to be notified about important events without repeated checking of the incoming data on their part. Users often wish to respond to an event notification to take some further action in a quick and convenient manner.

The techniques of the invention are directed to providing an event notification system that proactively contacts the user and puts the user in contact with an interactive web application that can respond to the user's further requests. For example, instead of the user actively monitoring an overnight delivery web site to determine when a package was delivered or when the delivery service will deliver packages to the user's office, the techniques of the invention can be used to contact the user by a telephone, or other two-way audio communication device, to notify the user when packages will be delivered and respond to further requests by the user. In one arrangement, the user can respond, in the same phone session, and provide a further a response to a web application. For example, the phone message can indicate that the delivery service will be delivering packages at a certain time, and request whether the user has any packages to be picked up at that same time.

In another example, a service can monitor a user's electronic mail messages for a message of particular significance, such as an urgent message from the user's boss. The service can then contact the user by telephone to inform the user of the urgent message. The service can also ask if the user over the telephone if the user wishes to hear the urgent message.

In one embodiment, the invention is directed to a method for notifying a telephony device over a network of an occurrence of an event detected by an independent process. The method includes receiving an event indicator over a network in response to the occurrence of the event. The event indicator is capable of activating a session of a web application based on an application-state data record created by the independent process. The method also include activating the web application session based on the application-state data record in response to receiving the event indicator and providing an event notification over the network. The event indicator is one that is suitable for providing audio output to the telephony device.

In another embodiment, the method includes receiving a uniform resource locator (URL) request identifying a persistent extensible markup language (XML) document including an identifier of the telephony device, a reference to an application-defining XML document, and event information based on the occurrence of the event. Another embodiment includes activating the session of the application based on an application-defining document identified in the application-state data record.

The invention is also directed to an application server configured for providing a notification for a telephony device over a network of an occurrence of an event detected by an independent process, including a network interface and an application runtime environment. The network interface is configured to receive an event indicator over the network from a proxy browser in response to the occurrence of the event. The event indicator is capable of activating a session of a web application executing in the application runtime environment based on an application-state data record created by an independent process and specified in the event indicator. The application runtime environment is configured to activate the session of the web application based on the application-state data record in response to receiving the event indicator. The network interface is configured to provide an event notification over the network to the proxy browser, the event notification suitable for providing audio output to the telephony device.

In another embodiment, the event indicator includes a uniform resource locator (URL) request identifying a persistent extensible markup language (XML) document including an identifier of the telephony device, a reference to an application-defining XML document, and event information based on the occurrence of the event. In a further embodiment, the system of the invention includes a document database, and the application-state data record identifies an application-defining document in the document database. The application runtime activates the session of the web application based on the application-defining document.

Another embodiment of the invention is directed to a computer program product that includes a computer readable medium having instructions stored thereon for notifying a telephony device over a network of a occurrence of an event detected by an independent process. The instructions, when carried out by a computer, cause the computer to perform any or all of the operations disclosed herein of the invention. For example, the instructions cause the computer to receive an event indicator over the network in response to the occurrence of the event. The event indicator is capable of activating a session of a web application based on an application-state data record created by an independent process. The instructions also cause the computer to activate the session of the web application based on the application-state data record in response to receiving the event indicator, and provide an event notification over the network, the event notification suitable for providing audio output to the telephony device.

The invention is also directed to an application server configured for providing a notification for a telephony device over a network of an occurrence of an event detected by an independent process, including a network interface and means for providing notification of the event. The network interface is configured to receive an event indicator over the network from a proxy browser in response to the occurrence of the event. The event indicator is capable of activating a session of a web application based on an application-state data record created by an independent process and specified in the event indicator. The producing notification means is configured to activate the session of the web application based on the application-state data record in response to receiving the event indicator. The network interface is configured to provide an event notification over the network to the proxy browser, the event notification suitable for providing audio output to the telephony device.

In another embodiment, the invention is directed to a method in a persistent process executing on a server for providing notification over a network of an occurrence of an event. The method includes monitoring data for the occurrence of the event, generating an application-state data record specifying a session of a web application in response to the occurrence of the event, and providing an event indicator over the network in response to the generating of the application-state data record, the event indicator capable of activating the session of the web application based on the application-state data record.

In a further embodiment, the method includes generating a persistent extensible markup language (XML) document including an identifier of a client device, a reference to an application-defining XML document, and event information based on the occurrence of the event, and providing a uniform resource locator (URL) identifying the persistent XML document and a location of the web application to a proxy browser. The proxy browser is capable of requesting activation of the session of the web application based on the URL.

The method includes, in other embodiments, accessing data in a web site or monitoring data incoming over the network. In another embodiment, the method includes storing the application-state data record in a database accessible to an application server capable of executing the session of the web application. In a further embodiment, the method includes providing a telephony number associated with a client device.

In another embodiment, the invention is directed to a system for providing notification over a network of an occurrence of an event, including a network interface, and a persistent process that is in communication with the network interface. The persistent process is configured generate an application-state data record specifying a session of a web application capable of execution on an application server in response to the occurrence of the event, and provide an event indicator over the network using the network interface in response to the generation of the application-state data record. The event indicator is capable of activating the session of the web application based on the application-state data record.

In another embodiment, the persistent process is configured to generate within the application-state data record a persistent extensible markup language (XML) document comprising an identifier of a client device, a reference to an application-defining XML document, and event information based on the occurrence of the event. The event indicator includes a uniform resource locator (URL) identifying the persistent XML document and a location of the web application. The persistent process provides the event indicator to a proxy browser that is capable of requesting activation of the session of the web application based on the URL.

In other embodiments, the persistent process is configured to access data in a web site or monitor data incoming over the network. In another embodiment, the persistent process stores the application-state data record in a database accessible to an application server capable of executing the session of the web application. In a further embodiment, the application-state data record includes a telephony number associated with a client device.

In another embodiment, the invention is directed to a computer program product that includes a computer readable medium having instructions stored thereon for providing notification of an event over a network. The instructions, when carried out by a computer, cause the computer to perform any or all of the operations disclosed herein of the invention. For example, the instructions cause the computer to monitor data for the occurrence of the event, generate an application-state data record specifying a session of a web application in response to the occurrence of the event, and provide an event indicator over the network in response to the generating of the application-state data record. The event indicator is capable of activating the session of the web application based on the application-state data record.

In a further embodiment, the invention is directed to a computer program propagated signal product embodied in a propagated medium, having instructions for providing notification of an event over a network. The instructions, when carried out by a computer, cause the computer to perform any or all of the operations disclosed herein of the invention. For example, the instructions cause the computer to monitor data for the occurrence of the event, generate an application-state data record specifying a session of a web application in response to the occurrence of the event, and provide an event indicator over the network in response to the generating of the application-state data record. The event indicator is capable of activating the session of the web application based on the application-state data record.

In another embodiment, the invention is directed to a system for providing notification over a network of an occurrence of an event, including a network interface and means for producing an event indicator. The producing means is in communication with the network interface. The producing means is configured to generate an application-state data record specifying a session of a web application capable of execution on an application server in response to the occurrence of the event, and provide an event indicator over the network in response to the generation of the application-state data record. The event indicator is capable of activating the session of the web application based on the application-state data record.

In some embodiments, the techniques of the invention are implemented primarily by computer software. The computer program logic embodiments, which are essentially software, when executed on one or more hardware processors in one or more hardware computing systems cause the processors to perform the techniques outlined above. In other words, these embodiments of the invention are generally manufactured as a computer program stored on a disk, memory, card, or other such media that can be loaded directly into a computer, or downloaded over a network into a computer, to make the device perform according to the operations of the invention.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

FIGS. 8A through 8D illustrate sample extensible markup language (XML) documents suitable for use with the embodiment of the invention shown in FIG. 7, including a sample application state XML document and sample application defining XML menu documents.

DETAILED DESCRIPTION

The invention is directed to techniques for notifying a client device, such as a telephony device, of the occurrence of an event using an event notification application which has been activated based on an application-state data record. In one embodiment, a persistent process monitors incoming data for the occurrence of an event and provides an application-state data record that can be used to activate a session of an event notification application. The persistent process provides an event indicator to a proxy browser which is connected, in one example, to the telephony device. The proxy browser requests activation of the event notification application at a specified (or default) application server based on the event indicator. The event notification application provides an event notification suitable for audio output to the proxy browser, which in turn provides the audio output providing notification of the event to the telephony device. The user of the client device can then respond to the event notification or otherwise interact with the event notification application via the proxy browser.

FIGS. 1 through 5 are diagrams illustrating an example of the environment in which the invention can be implemented.

Figure 1:
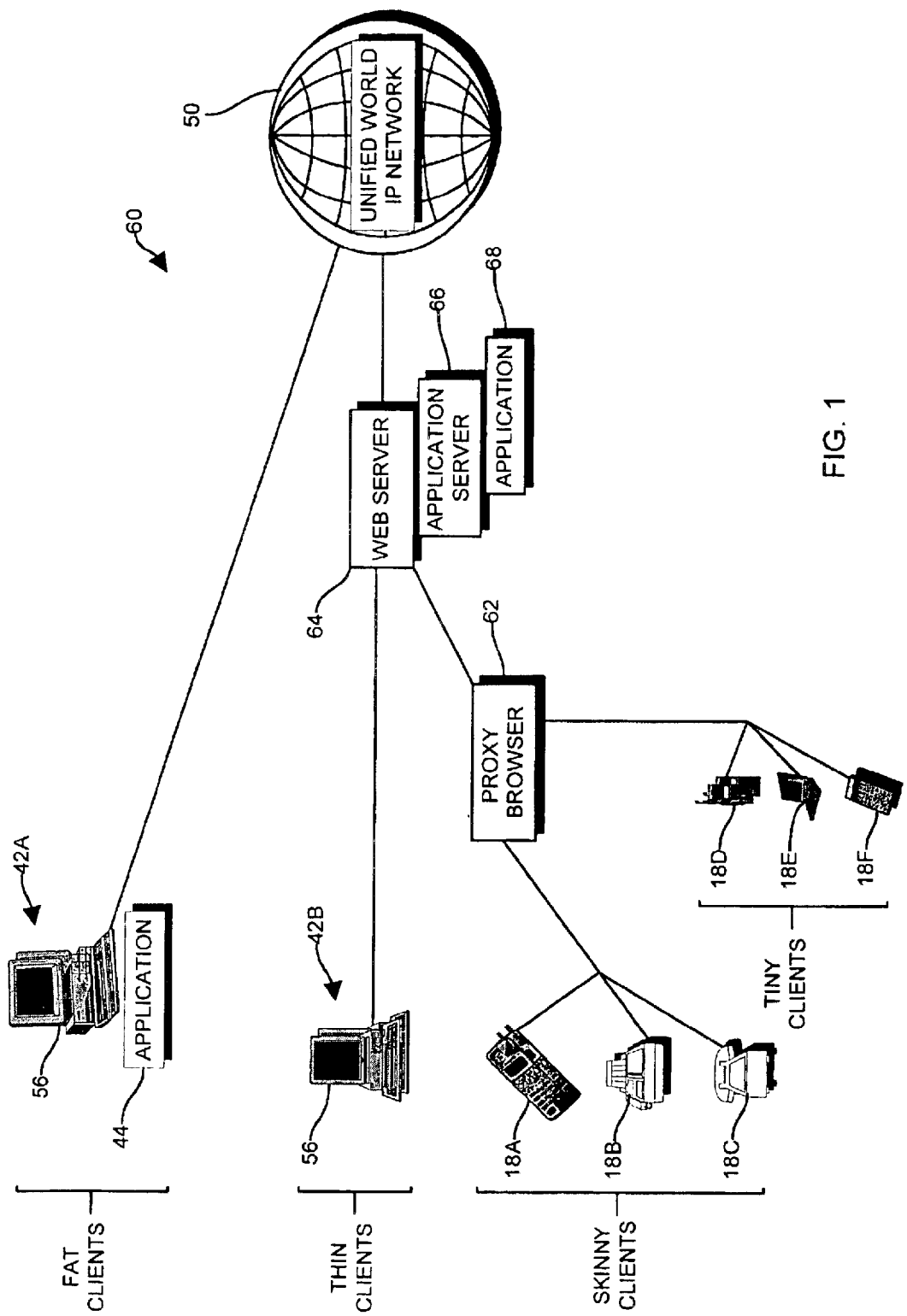
FIG. 1 is a block diagram illustrating a paradigm that enables unified voice messaging services and data services to be provided via an IP network using browser audio control according to an embodiment of the present invention.

FIG. 1 is a block diagram illustrating a unified communications architecture 60 that provides unified voice messaging services and data services via an IP network using browser audio control according to an embodiment of the present invention, based on FIG. 1 of the above-incorporated application Ser. No. 09/501,516. FIG. 1 illustrates clients 42 (shown individually as 42*a* and 42*b*), a unified world IP (Internet Protocol) network 50, skinny and tiny clients 18 (shown individually as skinny clients 18*a*, 18*b*, and 18*c*, and tiny clients 18*d*, 18*e*, and 18*f*), proxy browser 62, web server 64, application server 66, and application environment 68. The fat client 42*a* includes a browser 56 and a local application 44 running on the fat client 42*a* and providing services to the fat client 42*a*. The fat client 42*b* includes a browser 56.

The clients 42a and 42b, referred to herein as "fat clients" and "thin clients", respectively, have the distinct advantage that they can initiate requests using IP protocol to any connected web server 64 to execute part or most of the applications 44 on behalf of the clients. An example of a fat client 42a is an e-mail application on a PC that knows how to run the application 44 and knows how to run the IP protocols to communicate directly with the messaging server via the packet switched network 50. An example of a thin client 42b is a PC that has a web browser 56, which, in this case, can use IP protocols such as HTTP to receive and display web pages generated according to hypertext markup language (HTML) from server locations based on uniform resource locators (URL's) input by the user of the PC.

As shown in FIG. 1, each of the clients (tiny clients 18d, 18e, 18f; skinny clients 18a, 18b, 18c; thin clients 42b; and fat clients 42a) are able to communicate via a single, unified architecture 60 that enables voice communications services between different clients, regardless of whether the client actually has browser capabilities. Hence, the fat client 42a and the thin client 42b are able to execute voice enabled web applications without any hardware modification or any modification to the actual browser; rather, the browsers 56 in the clients 42a and 42b merely are provided with an executable voice resource configured for providing browser audio control, described below.

The user devices 18a, 18b, and 18c, illustrated as a cordless telephone 18a, a fax machine 18b having an attached telephone, and an analog telephone 18c, are referred to herein as "skinny clients," defined as devices that are able to interface with a user to provide voice and/or data services (e.g., via a modem) but cannot perform any direct control of the associated access subnetwork.

The wireless user devices 18d, 18e, and 18f, illustrated as a cellular telephone (e.g., AMPS, TDMA, or CDMA) 18d, a handheld computing device (e.g., a 3-Com Palm Computing or Windows CE-based handheld device) 18e, and a pager 18f, are referred to as tiny clients. "Tiny clients" are distinguishable from skinny clients in that the tiny clients tend to have even less functionality in providing input and output interaction with a user, rely exclusively on the executable application in an access subnetwork to initiate communications; in addition, some types of tiny clients may pot be able to send or receive audio signals such as voice signals at all.

Hence, the skinny clients 18a, 18b, and 18c and the tiny clients 18d, 18e, and 18f access the unified voice messaging services in the unified network 60 via a proxy browser 62, configured for providing an IP and HTTP interface for the skinny clients and the tiny clients. In particular, browsers operate by interpreting tags within a web page supplied via an HTTP connection, and presenting to a user media content information (e.g., text, graphics, streaming video, sound, etc.) based on the browser capabilities; if a browser is unable to interpret a tag, for example because the browser does not have the appropriate executable plug-in resource, then the browser typically will ignore the unknown tag. Hence, the proxy browser 62 can provide to each of the skinny clients and tiny clients the appropriate media content based on the capabilities of the corresponding client, such that the cordless telephone 18a and telephone 18c receive analog audio signals played by the proxy browser 62 and no text information (unless a display is available); the fax machine 18b and pager 18f only receive data/text information, and the cellular telephone 18d and the handheld computing device 18e receive both voice and data information. Hence, the proxy browser 62 interfaces between the IP network and the respective local access devices for the skinny clients and the tiny clients to provide access to the unified messaging network 60.

The proxy browser 62 and the web browsers 56 within the fat client 42a and the thin client 42b execute voice enabled web applications by sending data and requests to a web server 64, and receiving hypertext markup language (HTML) web pages from the web server 64, according to hypertext transport protocol (HTTP). The web server 64 serves as an interface between the browsers 56, 62 and an application server 66 that provides an executable runtime environment for XML voice applications 68. For example, the web server 64 may access the application server 66 across a common gateway interface (CGI), by issuing a function call across an application programming interface (API), or by requesting a published XML document or an audio file requested by one of the browsers 56 or 62. The application server 66, in response to receiving a request from the web server 64, may either supply the requested information in the form of an HTML page having XML tags for audio control by a voice resource within the browser, or may perform processing and return a calculated value to enable the browser 56 or 62 to perform additional processing.

The application server 66 accesses selected stored XML application pages (i.e., pages that define an application) and in response generate new HTML pages having XML tags during runtime and supply the generated HTML pages having XML tags to the web server 64. Since multiple transactions may occur between the browser 56 or 62 and the application server 66, the application server 66 is configured to store, for each existing user session, a data record, referred to as a "brownie", that identifies the state of the existing user session; hence, the application server 66 can instantiate a procedure, return the necessary data, and terminate the procedure without the necessity of maintaining the instance running throughout the entire user session.

Hence, the application server 66 executes voice application operations from a stored XML document based on a transient application state, where the application server 66 terminates the application instance after outputting the generated XML media information to the browser 62.

Figure 2:
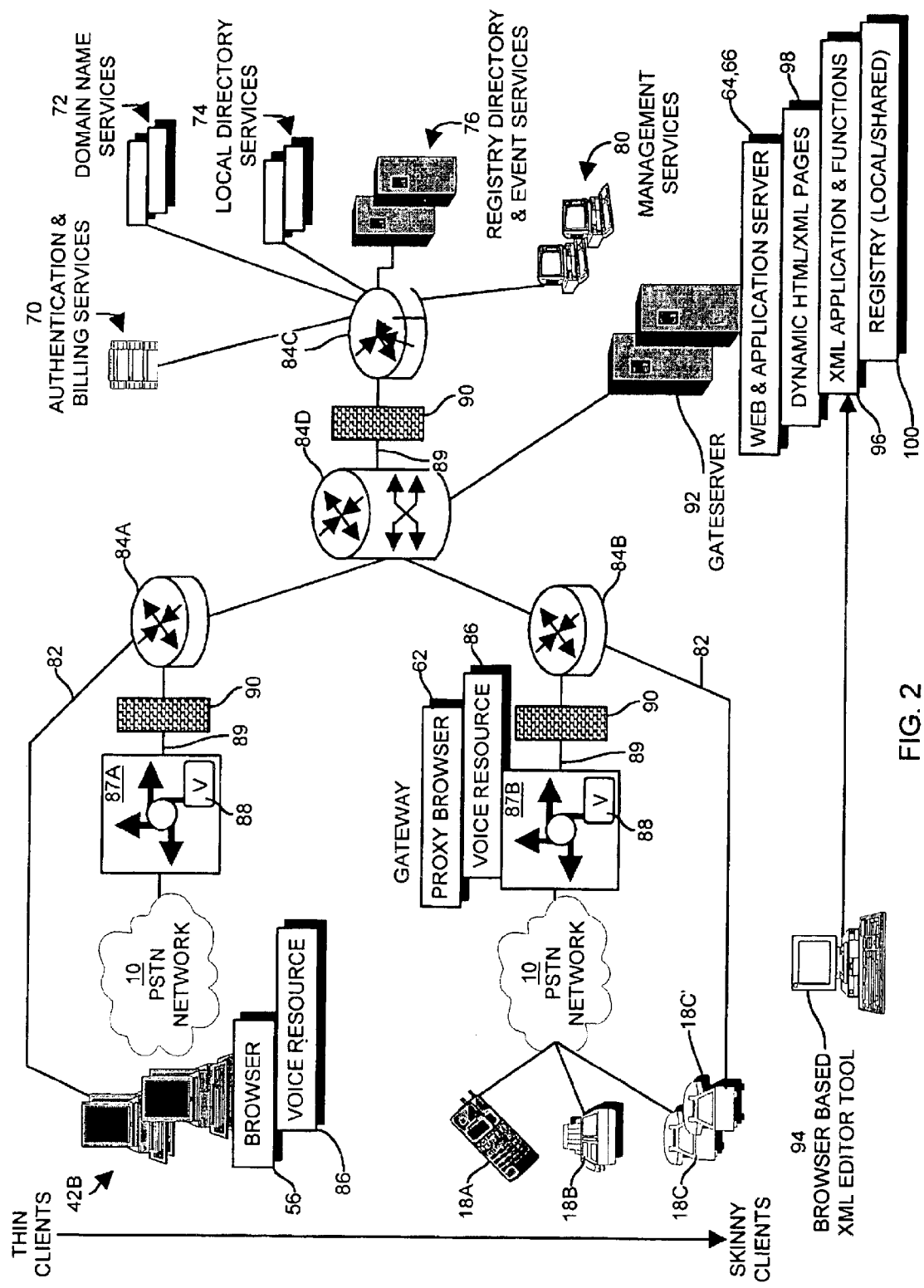
FIG. 2 is a diagram illustrating in further detail implementation of audio applications on the IP network of FIG. 1 according to an embodiment of the present invention.
Figure 4:
FIG. 4 is a diagram illustrating a data record generated and stored by the application server of FIG. 2 for preservation of application state and user attributes according to an embodiment of the present invention.

FIG. 2 is a diagram that illustrates in further detail the network 60 of FIG. 1, based on FIG. 4 of the above-incorporated application Ser. No. 09/480,485. As shown in FIG. 2, the arrangement of providing browser audio control for voice enabled web applications by the web server 64 and the application server 66 enables voice application services to be implemented in a web server paradigm for many different telephony services, including authentication and billing services 70, domain name services 72, local directory services 74, registry directory and event services 76, and management services 80.

In addition to FIG. 1, FIG. 2 includes PSTN (Public Switched Telephone Network) 10, voice resources 86, IP (Internet Protocol) connections 82, routers 84a, 84b, 84c, 84d, IP gateway 87a, 87b, voice over IP interface 88, HTTP connections 89, firewalls 90, gateserver 92, a browser based XML editor tool 94, XML applications and functions 96, dynamic HTML/XML pages 98, and a registry 100. FIG. 2 also illustrates in further detail the browser and web application server interaction. In particular, the thin clients 42b (and fat clients 42a) may be configured for accessing the web server 64 via a direct IP connection 82 to a router 84. The thin client 42b can directly access the web server 64 for voice enabled web application services if the thin client 42b has a browser 56 and an executable voice resource 86, for example an executable XML aware plug-in resource, or a Java applet embedded within a received HTML page. Alternatively, the thin client 42b may access the web server 64 via the public switched telephone network 10, where an IP gateway 87a includes a voice over IP interface 88 that sends information to the server 64 using an HTTP connection 89 via a firewall 90.

Since the skinny clients and tiny clients 18 do not have browser resources, the skinny clients and tiny clients 18 access the proxy browser 62 via the PSTN 10 and the IP gateway 87b. The IP gateway 87b includes both a proxy browser 62 and a voice resource 86, enabling the IP gateway 87 to provide all audio control service for the skinny clients and tiny clients 18. Hence, the PSTN 10 is used merely for transfer of analog audio signals, with intelligent application processing being provided by the proxy browser 62. Note that if one of the telephones 18c' is an IP telephone, then it can access the server 64 via an IP connection 82; in this case, the browser internal to the IP telephone 18c' processes only audio functions, and ignores any tags associated with text or image content.

As shown FIG. 2, the web server 64, the application server 66, and the voice web applications 68 reside within a gateserver 92. The gateserver 92 includes a browser based XML editor tool 94 that enables a web programmer to design voice applications using XML pages. The XML pages are stored as XML applications and functions 96, for example within a document database accessible by the application server 66. The XML pages stored within the XML application and functions database 96 may be stored as static pages to be fetched by the web server 64 and supplied to a browser, however the XML pages may also define the actual application to be executed by the application server 66 in runtime.

According to the disclosed embodiment, the browsers 56 and 62 provide audio control for voice enabled web applications based on the HTML-XML pages supplied by the application server 66 to the web server 64 for transport across an HTTP connection.

The application server 66 executes stored XML applications, also referred to generally as a web applications, in response to HTML requests from the user. In particular, four types of XML documents are used by the application server 66 to execute web applications: menu documents, activity documents, decision documents, and "brownies". The menu documents, activity documents, and decision documents are XML documents that define user interface and boolean-type application logic for a web application, hence are considered "executable" by the application server 66. The brownie document is an XML data record used to specify application state and user attribute information for a given XML application during a user session. During execution of the stored XML applications, the application server 66 stores the "brownie" in a registry 100.

Hence, the XML documents define user interface logistics and tie services and application server events together in a meaningful way, forming a coherent application or sets of applications. Additional details regarding the definition of executable voice applications using XML documents are described in the above-incorporated application Ser. No. 09/501,516.

Figure 3:
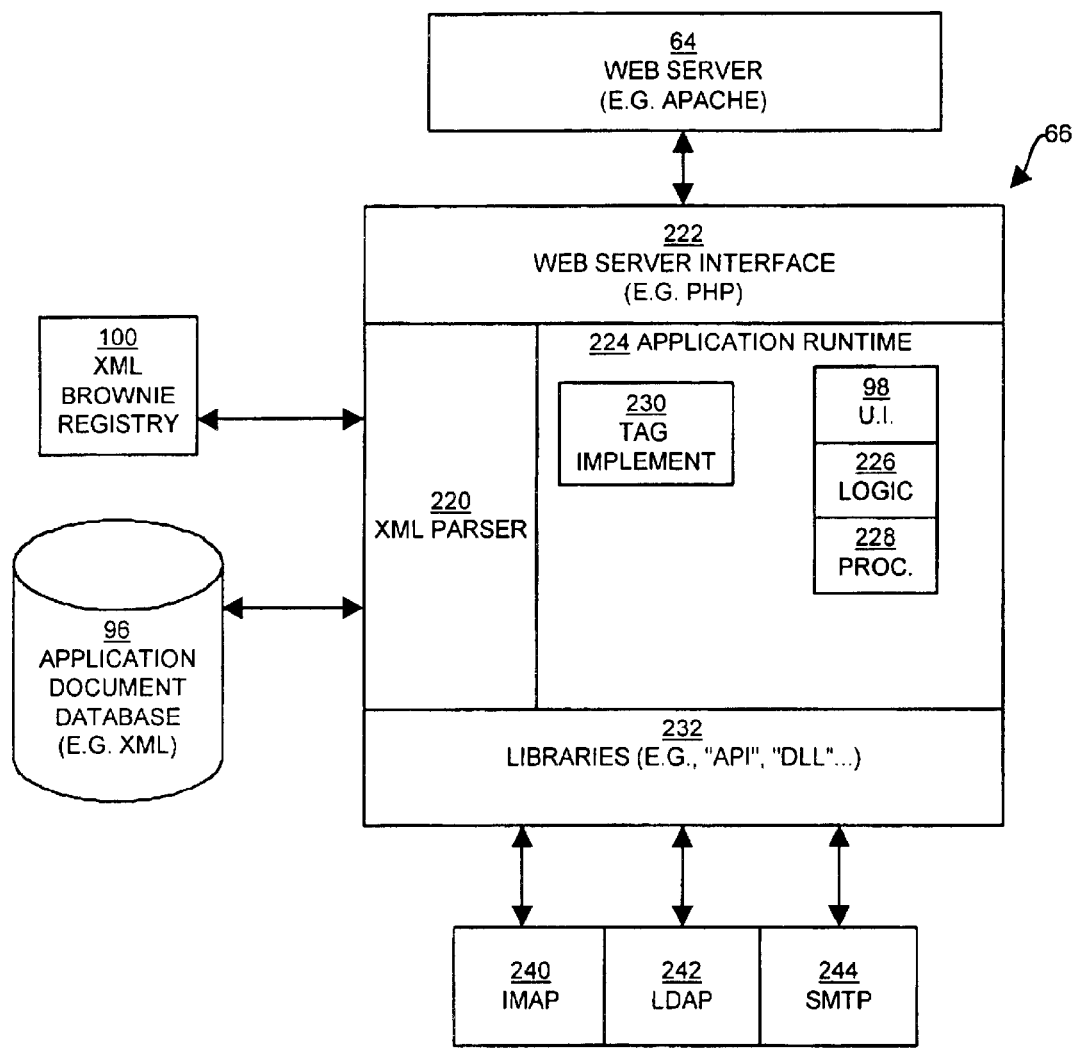
FIG. 3 is a diagram illustrating in detail the application server of FIG. 2 according to an embodiment of the present invention.

FIG. 3 is a diagram illustrating in detail the application server 66 according to an embodiment of the present invention, based on FIG. 8 of the above-incorporated application Ser. No. 09/480,485. The application server 66 is implemented as a server executing a PHP hypertext processor with XML parsing and processing capabilities, available open source at a web site currently having an address of "php.net" at the date of the filing of this application. As shown in FIG. 3, the server system 66 includes an XML parser 220 configured for parsing the application-defining XML documents stored in the XML document database 96, or the XML documents (i.e., "brownies") stored in the registry 100 and configured for specifying the state and attributes for respective user sessions. The application server 66 also includes a high speed interface 222 that establishes a high-speed connection between the application server 66 and the web server 64. For example, the PHP hypertext processor includes a high-speed interface for Apache web servers.

The application server 66 also includes a runtime environment 224 for execution of the parsed XML documents. As described above, the runtime environment 224 may selectively execute any one of user interface operation 98, a logic operation 226, or a procedure call 228 as specified by the parsed XML document. In particular, the application runtime environment 224 includes a tag implementation module 230 that implements the XML tags parsed by the XML parser 220. The tag implementation module 230 performs relatively low-level operations, for example dynamically generating an XML menu page in response to detecting a menu tag, performing a logical operation in response to a decision tag, or fetching an audio (.wav) file in response to detecting a sound tag. Hence, the tag implementation module 230 implements the tag operations that are specified within the XML framework of the stored XML documents.

The application server 66 also includes a set of libraries 232 that may be implemented as dynamically linked libraries (DLLs) or application programming interface (API) libraries. The libraries 232 enable the runtime environment 224 to implement the procedures 228 as specified by the appropriate XML document. For example, the application server 66 may issue a function call to one of a plurality of IP protocol compliant remote resources 240, 242, or 244 according to protocols based on IMAP (Internet Message Access Protocol), LDAP (Lightweight Directory Access Protocol), or SMTP (Simple Mail Transfer Protocol), respectively. For example, the PHP hypertext processor includes executable routines capable of accessing the IMAP or LDAP services. Note that the mechanisms for accessing the services 240, 242, or 244 should be established within the application server 66 before use of XML documents that reference those services.

FIG. 4 is a diagram illustrating a brownie 102 that specifies application state and user attribute information according to an embodiment of the present invention. As shown in FIG. 4, the brownie 102 is implemented as an XMl document that includes XML tags that specify the application state and user attribute information. For example, the brownie 102 includes an XML tag 104 that specifies a session identifier ("sesid") for a unique application session. As described below, the application server 66 generates a unique session identifier 104 for each brownie 102, enabling each user to have his or her own unique brownie 102 for a given interactive user session.

The application server 66 also generates XML tags 106 and 108 that specify attributes for the user. These tags are data fields as retrieved by an application instance and stored in the brownie in order to maintain persistence. For example, the XML tag 106 identifies the user identifier as "user1", where the value "user1" specifies a unique user ID. The unique user ID in tag 106 may be used as the login to an IMAP mailbox, an ID for a pager, and the like. The XML tag 108 specifies a password state for the corresponding user; for example the XML tag 108 may specify the password to be entered by the user (e.g., "abxy"), or alternately the XML tag 108 may specify that the user has already been authenticated during a previous interaction during the same user session specified in the session identifier 104.

The application server 66 also generates an XML tag 110 that specifies the application state with the user. For example, the state "XML_Menu_State" specifies that the last page executed by the application server 66 for the corresponding session ID "12345" was the XML application page "main.xml". Hence, the application server 66, upon determining that the prior application state was "main.xml", may be able to determine the next subsequent page that needs to be generated for the user session based on the user input. For example, if the user input was a value of "2", the application server 66 would be able to interpret the input as selection "2" from a previously supplied main menu; hence, the application server 66 could execute the XML application that corresponds to selection "2" from the main menu of the user session, providing the perception to the user of a state-full interactive voice application.

Figure 5:
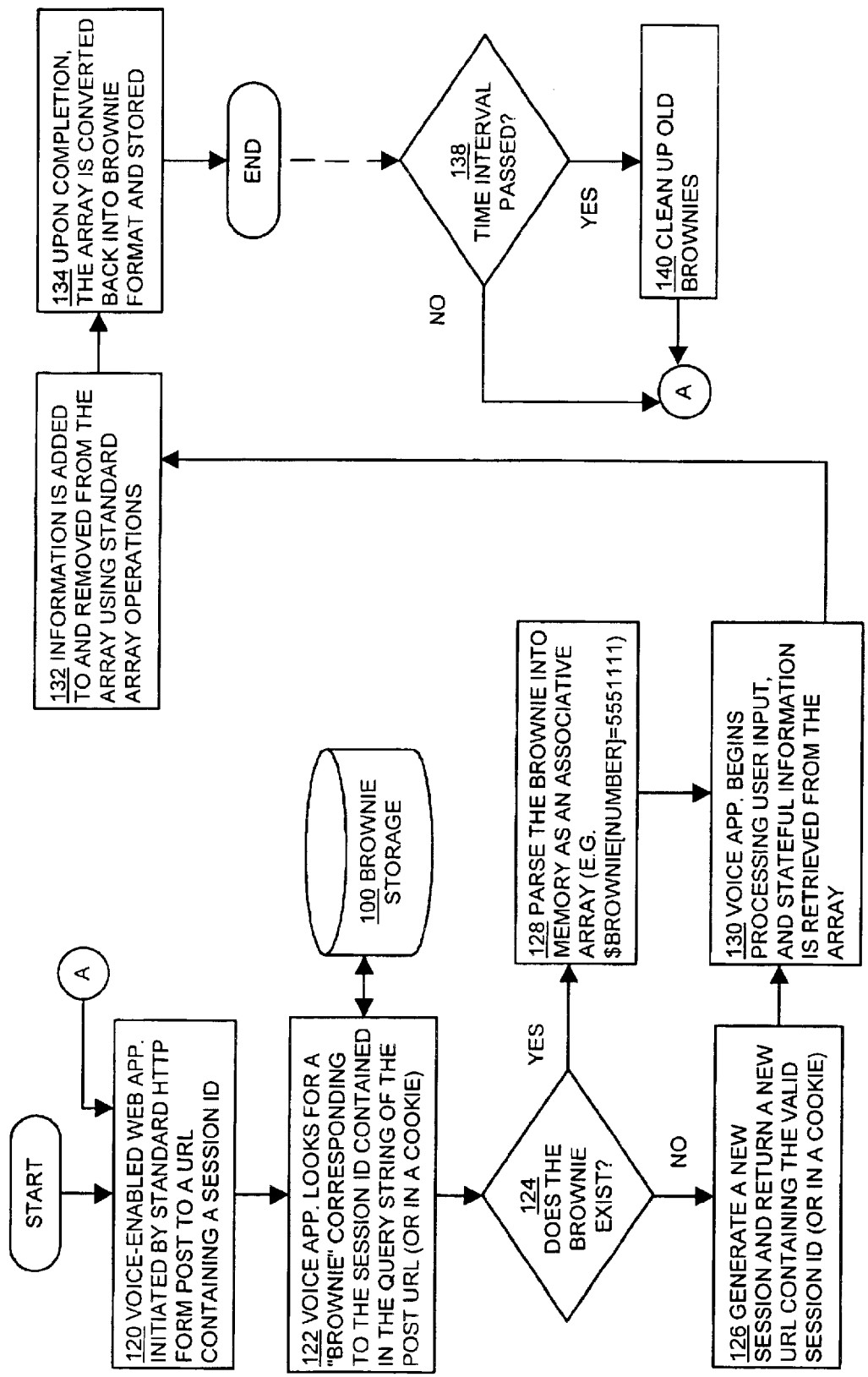
FIG. 5 is a flow diagram illustrating a method of generating a data record for preservation of application state for voice enabled web applications according to an embodiment of the present invention.

FIG. 5 is a diagram illustrating a method of executing web application instances using a data record to store application state information according to an embodiment of the present invention. The steps described in FIG. 5 can be implemented as computer code that is stored on a computer readable medium (e.g., a hard disk drive, a floppy drive, a random access memory, a read only memory, an EPROM, a compact disk, etc.).

The method begins in step 120 by the application server 66 initiating execution of the first web application instance in response to receiving an HTML request from a user. Specifically, the web application instance is initiated by the application server 66 in response to reception of a standard HTTP form post to a URL containing a session identifier. Alternately, a new session may be initiated upon detection of a standard HTTP form post to a default URL.

In response to detecting the session identifier in the HTML request, the application server 66 in step 122 searches for a brownie 102 in the storage registry 100 that corresponds to the session identifier contained in the query string of the post URL. Alternatively, the session identifier may be specified in a cookie supplied by the browser 56 or 62 along with the HTTP request (e.g., the standard HTTP form post to the default URL). If in step 124 the application server 66 determines that the brownie does not exist for the supplied session identifier, the application server 66 generates a new session in step 126 and returns a new URL containing the valid session identifier (alternately, the new session ID may be supplied in a cookie to the browser). However, if in step 124 the application server 66 determines that a brownie 102 exists for the corresponding session identifier 104, the application server 66 in step 128 parses the brownie 102 into an internal memory as an associative array.

The application server 66 then begins execution in step 130 of a selected web application instance based on the user input and the application state 108 supplied in the corresponding brownie 102. The application server 66 selectively adds and removes state information from the associative array, used to temporarily store state and user attribute information, during the execution of the web application instance in step 132. Upon completion of the execution of the web application instance in step 134, the application server 66 converts the information stored in the associative array back into a brownie format 102, stores the brownie back into the registry 100, and terminates the executed web application instance.

Hence, the application server 66 is able to maintain state information for a user session, giving the appearance of a single, interactive application. The application server 66 actually executes separate web application instances for each user request, using the data record 102 to maintain application state and user attribute information. Hence, the application server 66 can provide the appearance of an interactive voice response system that provides intelligent decisions based on the user profile and based on the current position of the user within a menu structure.

The application server 66 may also include an aging function, where data records 102 are removed from the registry 100 in step 140 after a prescribed time interval has passed in step 138. This aging function not only controls the storage requirements for the registry 100, but also provides enhanced security by maintaining the data records 102 for a limited period of time, for example five minutes; hence, any hackers that may access the brownies 102 will be unable to utilize the compromised brownies 102 once the prescribed time interval has passed.

Figure 6:
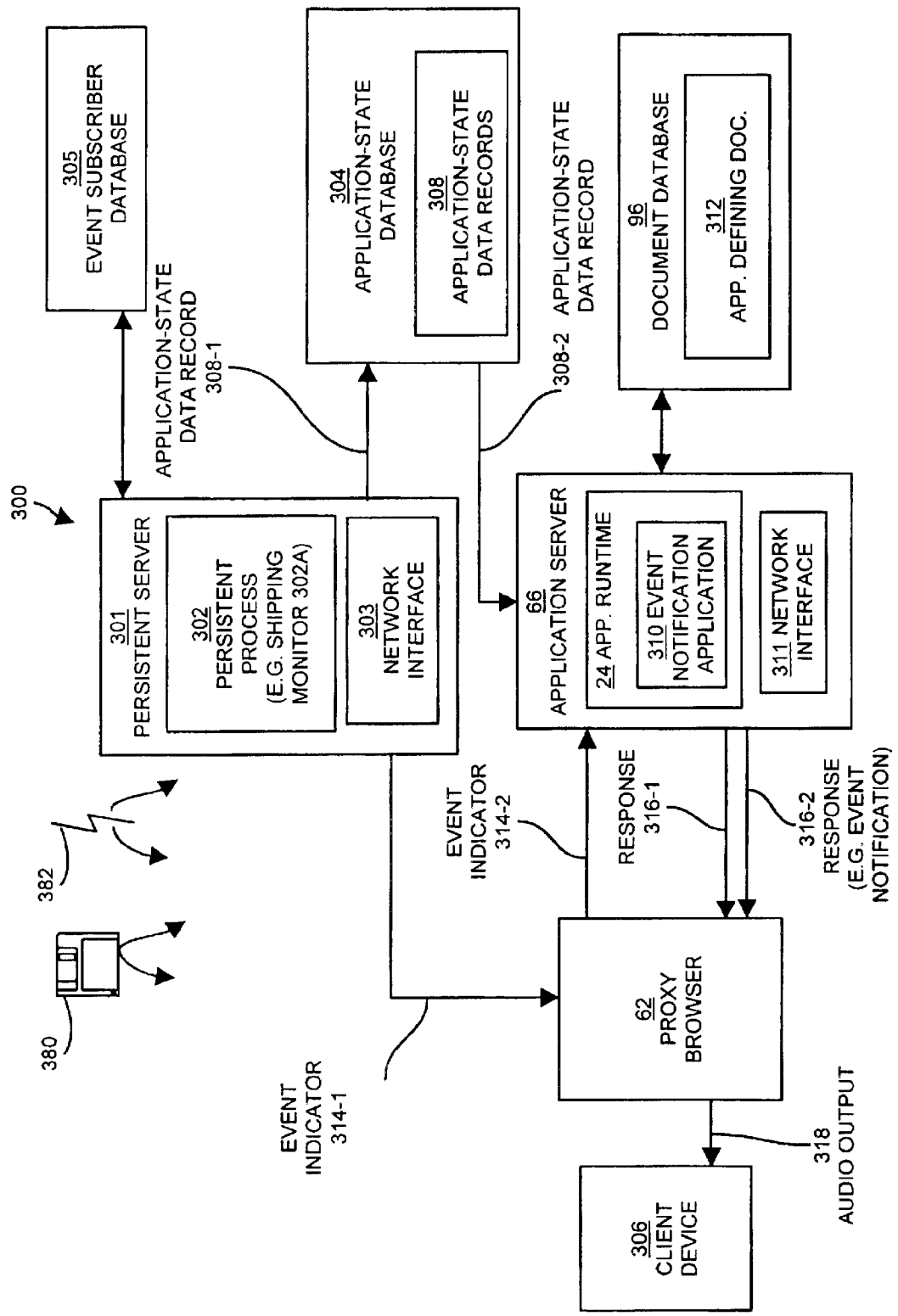
FIG. 6 is a block diagram including a persistent server, application-state database, event subscriber database, application server, document database, proxy browser, and client device, for one embodiment of the invention.

FIG. 6 is a block diagram of a network arrangement 300, which includes a persistent server 301, application-state database 304, event subscriber database 305, application server 66, document database 96, proxy browser 62, and client device 306, for one embodiment of the invention. The persistent server 301 is a server computer with a processor and memory which uses a network interface 303, such as an Internet interface, or other connection to communicate with the proxy browser 62 and the application-state database 304. The persistent process 302 is, for example, a software application, object, process, or other software entity executing on a server, herein referred to as the persistent server 301. The persistent process 302 is a software entity that is persistent, that is, in one embodiment, a process that endures without a predetermined limit or lifetime. For example, a persistent process 302 can monitor incoming data for the occurrence of an event, respond to the occurrence as described herein, and continue monitoring the data for the occurrence of other events. The application-state database 304 includes application-state data records 308, which, in one example, are data records recording the state of a web application. One example of an application-state data record is the "brownie" XML document 102 of FIG. 4. In one embodiment, the application-state database 304 is associated with the application server 66, as shown by a sample application-state database 304 implemented as the XML brownie registry 100 of FIG. 3. In another embodiment, the application-state database 304 is implemented as a separate database server computer connected by the Internet or other network connection to the persistent server 301 and the application server 66.

The persistent process 302 is in communication with the event subscriber database 305, which includes profile information for subscribers to an event notification service provided by the event notification application 310. In one embodiment, the persistent process 302 accesses the event subscriber database 305 over the Internet through the network interface 303. In another embodiment, the persistent process 302 accesses the event subscriber database 305 through a network connection other than the Internet, or the event subscriber database 305 is part of the persistent server 301. In a further embodiment, the event subscriber database 305 is an LDAP directory including subscriber information.

The application server 66 includes an application runtime 24, an application server network interface 311, an event notification application 310 capable of execution in the application runtime 24 on the application server 66, implemented, in one example, as a voice enabled XML application stored in the document database 96. The document database 96 is associated with the application server 66, in one embodiment, and includes application defining documents 312, implemented, in one example, as XML documents, that define the event notification application 310. The network interface 311 provides communication through a network, such as the Internet, to the proxy browser 62, document database 96, and application-state database 304. In one embodiment, the network interface 311 also provides a communication connection to the persistent server 301 and the event subscriber database 305.

The client device 306 is a limited communication device, for example, a handheld computing device 18*e*, a pager 18*f*, or a telephony device. The telephony device can be, for example, a cordless telephone 18*a*, a fax machine having an attached telephone 18*b*, an analog telephone 18*c*, or cellular telephone 18*d*.

In one embodiment, a computer program product 380 including a computer readable medium (e.g. one or more CDROM's, diskettes, tapes, etc.) provides software instructions for the persistent process 302 and/or event notification application 310. The computer program product 380 can be installed by any suitable software installation procedure, as is well known in the art. In another embodiment, the software instructions for the persistent process 302 and/or event notification application 310 can also be downloaded over a wireless connection. A computer program propagated signal product 382 embodied on a propagated signal on a propagation medium (e.g. a radio wave, an infrared wave, a laser wave, sound wave, or an electrical wave propagated over the Internet or other network) provides software instructions for the persistent process 302 and/or event notification application 310. In alternate versions, the propagated signal is an analog carrier wave or a digital signal carried on the propagated medium. For example, the propagated signal can be a digital signal propagated over the Internet or other network. In one embodiment, the propagated signal is a signal that is transmitted over the propagation medium over a period of time, such as the instructions for a software application sent in packets over a network over a period of seconds, minutes, or longer.

Figure 7:
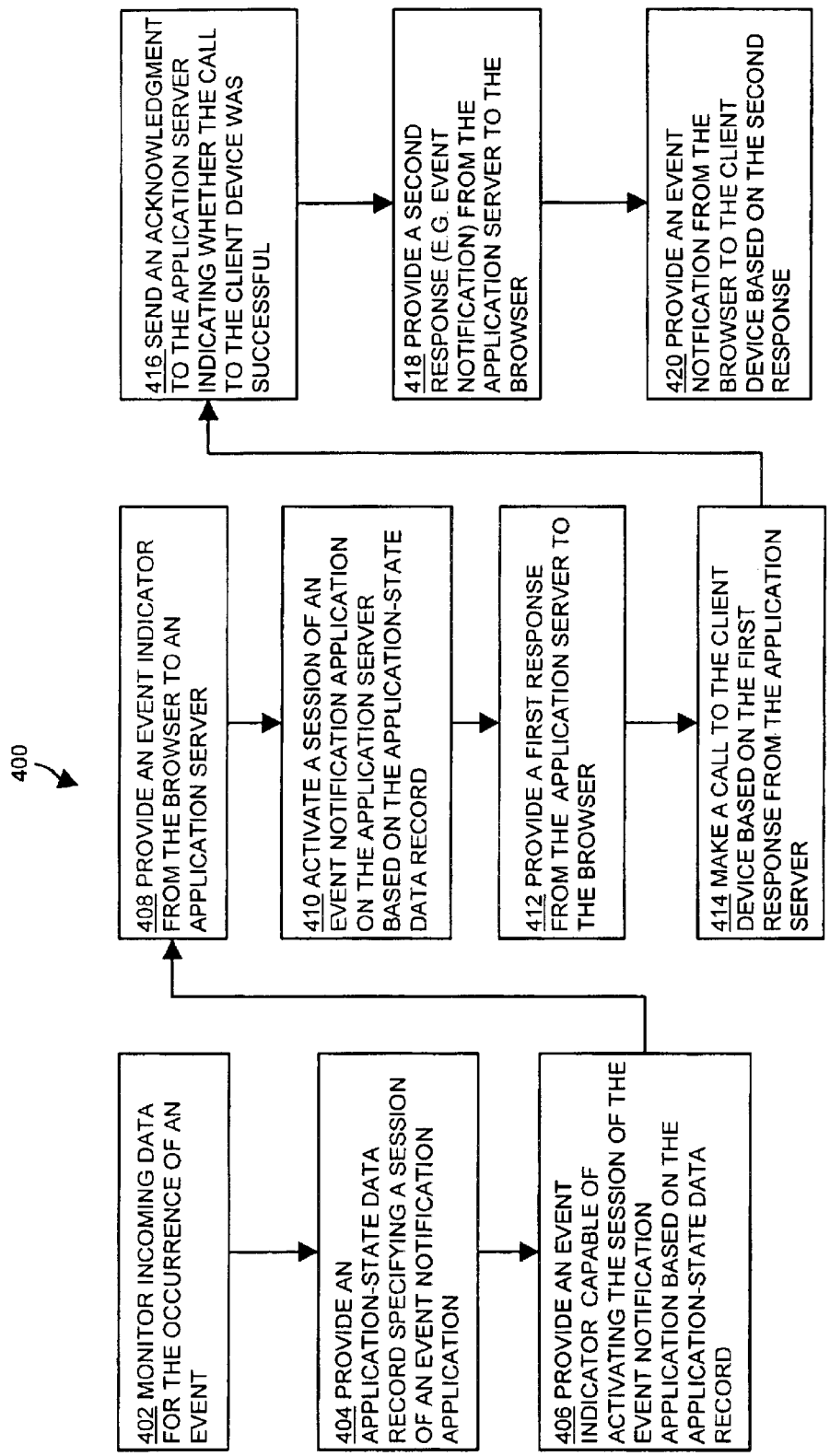
FIG. 7 is a flow diagram illustrating a method of monitoring the occurrence of an event and providing an event notification to a client device, for the embodiment of the invention shown in FIG. 6.

FIG. 7 is a flow diagram illustrating a method 400 which is performed by the network arrangement 300 and includes monitoring the occurrence of an event and providing an event notification to a client device 306, for the embodiment of the invention shown in FIG. 6. FIGS. 8A through 8D illustrate sample XML documents suitable for use with the embodiment of the invention of FIG. 7. In particular, FIG. 8A shows a sample application state XML document 500, which is an example of an application-state data record 308. FIGS. 8B through 8D illustrate sample application defining documents 312 for one embodiment of the invention. FIG. 8B illustrates a SHIPPING_NOTIFY_SETUP_CALL.xml document 520. FIG. 8C illustrates a SHIPPING_OUTCALL_PENDING.xml document. FIG. 8D illustrates a SHIPPING_PLAY_INFORMATION.xml document 560.

Further details of the method 400 will now be provided with reference to FIG. 7. In step 402, an independent or persistent process 302 monitors incoming data for the occurrence of an event. In one example, the persistent process 302 can be a shipping monitor program 302*a* or process that monitors the shipment and delivery of overnight packages for a user who is interested in knowing that a shipment has been delivered to a destination. The shipping monitor program 302*a* notices the occurrence of the event. For example, the shipping monitor program 302*a* monitors a web site or accesses a database provided by an overnight delivery service to check on events of interest to a user, based on the user's account number, or other identifying information.

In step 404, the persistent process 302 provides an application-state data record 308-1 (see FIG. 6) specifying a session of an event notification application 310 and stored in the application-state database 304. First, the persistent process 302 accesses the event subscriber database 305 to obtain profile information, such as the telephone number of the event subscriber's client device 306. The persistent process 302 then uses the profile information from the event subscriber database 305 when creating the application-state data record 308-1.

For example, the shipping monitor program 302*a* creates an application state XML document or brownie 500, as shown in FIG. 8A, specifying a new session of the event notification application 310. The application state document 500 has a session identification number associated with it, such as "11223344". The XML document 500 includes an XML state file 502 that indicates the initial state of the event notification application 310, a target phone number 504, a shipping time 506, and a shipment number 508. The shipping monitor program 302*a* retrieves the target phone number 504 from the event subscriber database 305 to indicate a client device 306 to be called for the event subscriber who is interested in the event that has occurred.

In step 406, the persistent process 302 then provides an event indicator 314-1 (see FIG. 6) capable of activating the session of the event notification application 310 based on the application-state data record 308-2 to the proxy browser 62.

For example, the shipping monitor 302*a* builds a URL such as the following:

http://appserver1.domain.com/appserver.app?RESUME:XML:11223344

The shipping monitor 302*a* then sends the event indicator 314-1, including this URL, to the proxy browser 62. The proxy browser 62 receives the event indicator 314-1 and interprets the URL. Based on the URL, the proxy browser 62 opens a socket to "appserver1.domain.com", which is the Internet address for an application server 66 that is capable of initiating a session of an event notification application 310.

In step 408, the proxy browser 62 provides an event indicator 314-2 to the application server 66. For example, the proxy browser 62 requests. "appserver.app?RESUME:XML:11223344", which is a request to start a session of an event notification application 310 (indicated in this example by the "appserver.app") using the application-state data record 308-1 (e.g. application state document 500 shown in FIG. 8A) indicated by the session ID, "11223344".

In another embodiment, the persistent process 302 sends the event indicator 314 as a message to an IMAP directory, which is then provided as a message to the application server 66. In other embodiments, the persistent process 302 uses other messaging, electronic mail, or communication services to provide the event indicator 314 to the application server 66. In further embodiments, the event indicator 314 includes the application-state data record 308-1 (or equivalent information), and the persistent process 302 is not required to store the application-state data record 308-1 in the application-state database 304.

In step 410, the application server 66 activates a session of the event notification application 310 based on the application-state data record 308-2 retrieved from the application-state database 304. For example, the application server 66 first accepts the event indicator 314-2, which includes the request to start the session of the event notification application 310. The application server 66 then locates the application state document 500 with the session ID 11223344, and retrieves it from the application-state database 304. The application server 66 then loads the XML state file 502 indicated in the application state document 500. This XML state file 502 is SHIPPING_NOTIFY_SETUP_CALL.xml 520, illustrated in FIG. 8B. Because the SHIPPING_NOTIFY_SETUP_CALL.xml file 520 is a decision type of application defining document 312, as indicated by the Type menu variable 526, the application server 66 executes the call_setup API 528 indicated in the Action option. The call_setup API 528 is passed "B|Target_PhoneNumber", which indicates to use the value of the target phone number 504 found in the brownie 500 (see FIG. 8A), which is "8885550000", which is the telephone number in this example for a client device 306.

In step 412, the proxy browser 62 receives a response 316-1 from the application server 66. For example, the application server 66 sends a response 316-1 to the proxy browser 62 that directs the proxy browser 62 to make a phone call to "888-555-0000" based on the target phone number 504 retrieved by the call setup API 528 from the application state document 500, as described above. The application server 66 then loads the MENU:SHIPPING_OUTCALL_PENDING.xml file 540 from option 532 in the SHIPPING_NOTIFY_SETUP_CALL.xml file 520. The MENU:SHIPPING_OUTCALL_PENDING.xml file 540 is illustrated in FIG. 8C.

In step 414, the proxy browser 62 contacts the client device 306. For example, the proxy browser 62 then makes the phone call to the client device 306.

In step 416, the proxy browser 62 makes an acknowledgment to the application server 66 based on the first response 316-1. For example, the proxy browser 62 sends an acknowledgment to the application server 66 with one of the values indicated in MENU:SHIPPING_OUTCALL_PENDING.xml file 540, such as "MAKECALL_NO" 548, indicating that the call was not made, "MAKECALL_OK" 550, indicating that the call was completed, or "TIMEOUT" 552, indicating that the call was not completed before a time out period. Assuming the user answers the client device 306, then the proxy browser 62 then posts MAKECALL_OK to the application server 66.

In step 418, the application server 66 provides a second response 316-2 (e.g. event notification) to the proxy browser 62. For example, the application server 66 loads the application defining document 312 indicated in the MAKECALL_OK option 550 of the MENU:SHIPPING_OUTCALL_PENDING.xml file 540. This application defining document 312 is SHIPPING_PLAY_INFORMATION.xml 560 (see FIG. 8D). The application server 66 then provides the second response 316-2, based on the SHIPPING_PLAY_INFORMATION.xml 560. This response 316-2 is an HTML page providing audio output files generated from SHIPPING_PLAY_INFORMATION.xml 560. The condition value 566 in SHIPPING_PLAY_INFORMATION.xml 560 causes the application server 66 to invoke the shipping_playinfo API 568, which provides a message "Your package number _____ will be here in _____ minutes." The application server 66 recovers the shipment number 508 and shipping time 506 from the application state document 500, inserts them into the message, and provides the message in an audio file to be included in the HTML page returned as a response 316-2 to the proxy browser 62. The application server 66 also includes a second audio file in the HTML response 316-2 that plays the prompts indicated in the text menu variable 570 in SHIPPING_PLAY_INFORMATION.xml 560.

In step 420, the proxy browser 62 provides an event notification, such as audio output 318, to the client device 306. For example, the proxy browser 62 plays the audio files in the second response 316-2 from the application server 66 for transmission to the client device 306. For example, the proxy browser 62 plays the two audio files based on SHIPPING_PLAY_INFORMATION.xml 560, as described above, so that the user of the client device 306 hears the following:

"Your package number 1442Z4E6 will be here in 15 minutes.

To inquire about another shipment, press 1.

To set up how you want to be notified, press 2."

While this invention has been particularly shown and described with references to preferred embodiments thereof, it will be understood by those skilled in the art that various changes in form and details may be made therein without departing from the spirit and scope of the invention as defined by the appended claims.

For example, the proxy browser 306, persistent server 301, application-state database 304, event subscriber database 305, and application server 66 are not required to be connected by the Internet, but may be connected by other types of network or direct line connections, as is known in the art. Also, the various combinations of functions and capabilities of the proxy browser 306, persistent server 301, application-state database 304, event subscriber database 305, and application server 66, as described herein, can be implemented on one computer system, rather than separate computer systems, or on many computer systems, such as in a distributed object or other distributed computing approach.

In addition, the persistent process 302 can be implemented as a hardware circuit, such as an ASIC (application specific integrated circuit) or implemented as part of some server computer other than the persistent server 301. For example, the persistent process 302 can be implemented to execute on an electronic mail server to monitor users' mail messages as they are received by the electronic mail server.

What is claimed is:

1. A method for notifying a telephony device over a network of an occurrence of an event detected by an independent process, comprising the steps of:

receiving an event indicator over the network in response to the occurrence of the event, the event indicator capable of activating a session of a web application based on an application-state data record created by the independent process, the event indicator comprising a uniform resource locator (URL) request identifying a persistent extensible markup language (XML) document, the persistent extensible markup language document comprising i) an identifier of the telephony device, ii) a reference to an application-defining XML document, and iii) event information based on the occurrence of the event;

activating the session of the web application based on the application-state data record in response to receiving the event indicator; and providing an event notification over the network, the event notification suitable for providing audio output to the telephony device.

2. The method of claim 1, wherein the step of activating the session of the web application comprises activating the session based on an application-defining document identified in the application-state data record.

3. A method as in claim 1 further comprising:
opening a socket with an application server; and
forwarding the event indicator to the application server to activate the session of the web application at the application server based on the application-state data record created by the independent process.

4. A method as in claim 3 further comprising:
receiving a response from the application server indicating to make a phone call based on a target phone number associated with the telephony device.

5. A method as in claim 4 further comprising:
based on the response from the application server, establishing the phone call with the telephony device.

6. A method as in claim 5 further comprising:
generating a message to the application server that the phone call has been established.

7. A method of claim 6 further comprising:
supporting communications between the telephony device and the application server, enabling a user of the telephony device to access the session of the web application and obtain responses to requests by the user.

8. An application server configured for providing a notification for a telephony device over a network of an occurrence of an event detected by an independent process, comprising:
a network interface;
an application runtime environment, wherein:
the network interface is configured to receive an event indicator over the network from a proxy browser in response to the occurrence of the event, the event indicator capable of activating a session of a web application executing in the application runtime environment based on an application-state data record created by an independent process and specified in the event indicator, the event indicator including a uniform resource locator (URL) request identifying a persistent extensible markup language (XML) document, the persistent extensible markup language document comprising i) an identifier of the telephony device, ii) a reference to an application-defining XML document, and iii) event information based on the occurrence of the event;
the application runtime environment is configured to activate the session of the web application based on the application-state data record in response to receiving the event indicator; and
the network interface is configured to provide an event notification over the network to the proxy browser, the event notification suitable for providing audio output to the telephony device.

9. The application server of claim 8, further comprising a document database, wherein the application-state data record identifies an application-defining document in the document database and the application runtime environment activates the session of the web application based on the application-defining document.

10. A computer program product that includes a computer readable medium having instructions stored thereon for notifying a telephony device over a network of a occurrence of an event detected by an independent process, such that the instructions, when carried out by a computer, cause the computer to perform the steps of:
receiving an event indicator over the network in response to the occurrence of the event, the event indicator capable of activating a session of a web application based on an application-state data record created by the independent process, the event indicator including a uniform resource locator (URL) request identifying a persistent extensible markup language (XML) document, the persistent extensible markup language document comprising i) an identifier of the telephony device, ii) a reference to an application-defining XML document, and iii) event information based on the occurrence of the event;
activating the session of the web application based on the application-state data record in response to receiving the event indicator; and
providing an event notification over the network, the event notification suitable for providing audio output to the telephony device.

11. A computer program product as in claim 10 in which the computer additionally performs operations of:
opening a communication session with an application server; and
via use of the communication session, forwarding the event indicator to the application server to activate the session of the web application at the application server based on the application-state data record created by the independent process.

12. A computer program product as in claim 11 in which the computer additionally performs an operation of:
receiving a response from the application server indicating to make a phone call based on a target phone number associated with the telephony device.

13. A computer program product as in claim 12 in which the computer additionally performs an operation of:
based on the response from the application server, establishing the phone call with the telephony device.

14. A computer program product as in claim 13 in which the computer additionally performs an operation of:
generating a message to the application server that the phone call has been established.

15. A computer program product as in claim 14 in which the computer additionally performs operations of:
supporting communications between the telephony device and the application server, the communications enabling a user of the telephony device to access the session of the web application and obtain responses to requests by the user.

16. An application server configured for providing a notification for a telephony device over a network of an occurrence of an event detected by an independent process, comprising
a network interface;
means for providing notification of the event, wherein:
the network interface is configured to receive an event indicator over the network from a proxy browser in response to the occurrence of the event, the event indicator capable of activating a session of a web application based on an application-state data record created by an independent process and specified in the event indicator, the event indicator comprising a uniform resource locator (URL) request identifying a persistent extensible markup language (XML) document, the persistent extensible markup language document comprising i) an identifier of the telephony device, ii) a reference to an application-defining XML document, and iii) event information based on the occurrence of the event;

the providing notification means is configured to activate the session of the web application based on the application-state data record in response to receiving the event indicator; and the network interface is configured to provide an event notification over the network to the proxy browser, the event notification suitable for providing audio output to the telephony device.

17. A method in a persistent process executing on a server for providing notification over a network of an occurrence of an event, comprising the steps of:

monitoring data for the occurrence of the event;

generating an application-state data record specifying a session of a web application in response to the occurrence of the event, the generated application-state data record comprising a persistent extensible markup language (XML) document, the persistent extensible markup language document comprising i) an identifier of a client device, ii) a reference to an application-defining XML document, and iii) event information based on the occurrence of the event; and providing an event indicator including i) a uniform resource locator (URL) identifying the persistent XML document and ii) a location of the web application over the network to a proxy browser in response to the generating of the application-state data record, the proxy browser capable of requesting activation of the session of the web application based on the uniform resource locator.

18. The method of claim 17, wherein the step of monitoring data comprises accessing data in a web site.

19. The method of claim 17, wherein the step of monitoring data comprises monitoring data incoming over the network.

20. The method of claim 17, wherein the step of providing the application-state data record comprises storing the application-state data record in a database accessible to an application server capable of executing the session of the web application.

21. The method of claim 17, wherein the step of providing the application-state data record comprises providing a telephony number associated with a client device.

22. A system for providing notification over a network of an occurrence of an event, comprising:

a network interface; and a persistent process in communication with the network interface, wherein the persistent process is configured to:

generate an application-state data record specifying a session of a web application capable of execution on an application server in response to the occurrence of the event;

provide an event indicator over the network using the network interface in response to the generation of the application-state data record, the event indicator capable of activating the session of the web application based on the application-state data record; and wherein the persistent process is configured to generate within the application-state data record a persistent extensible markup language (XML) document comprising i) an identifier of a client device, ii) a reference to an application-defining XML document, and iii) event information based on the occurrence of the event; and the event indicator comprises a uniform resource locator (URL) identifying the persistent XML document and a location of the web application, wherein the persistent process provides the event indicator to a proxy browser that is capable of requesting activation of the session of the web application based on the URL.

23. The system of claim 22, wherein the persistent process is configured to access data in a web site.

24. The system of claim 22, wherein the persistent process is configured to monitor data incoming over the network.

25. The system of claim 22, wherein the persistent process stores the application-state data record in a database accessible to an application server capable of executing the session of the web application.

26. The system of claim 22, wherein the application-state data record comprises a telephony number associated with a client device.

27. A computer program product that includes a computer readable medium having instructions stored thereon for providing notification of an event over a network, such that the instructions, when carried out by a computer, cause the computer to perform the steps of:

monitoring data for the occurrence of the event;

generating an application-state data record specifying a session of a web application in response to the occurrence of the event, the generated application-state data record comprising a persistent extensible markup language (XML) document, the extensible markup document comprising i) an identifier of a client device, ii) a reference to an application-defining XML document, and iii) event information based on the occurrence of the event; and providing an event indicator over the network in response to the generating of the application-state data record, the event indicator capable of acting the session of the web application based on the application-state data record.

28. A computer program propagated product embodied in a computer readable medium, having instructions for providing notification of an event over a network, such that the instructions, when carried out by a computer, cause the computer to perform the steps of:

monitoring data for the occurrence of the event;

generating an application-state data record specifying a session of a web application in response to the occurrence of the event, the generated application-state data record comprising a persistent extensible markup language (XML) document, the persistent extensible markup document comprising i) an identifier of a client device, ii) a reference to an application-defining XML document, and iii) event information based on the occurrence of the event; and providing an event indicator including i) a uniform resource locator (URL) identifying the persistent XML document and ii) a location of the web application over the network to a proxy browser in response to the generating of the application-state data record, the event indicator capable of activating the session of the web application based on the application-state data record, the proxy browser capable of requesting activation of the session of the web application based on the URL.

29. A system for providing notification over a network of an occurrence of an event, comprising:

a network interface; and means for producing an event indicator, the producing means in communication with the network interface, wherein the producing means is configured to:

generate an application-state data record specifying a session of a web application capable of execution on an application server in response to the occurrence of the event;

provide an event indicator over the network using the network interface in response to the generation of the application-state data record, the event indicator capable of activating the session of the web application based on the application-state data record;

wherein the producing means is configured to generate within the application-state data record a persistent extensible markup language (XML) document comprising i) an identifier of a client device, ii) a reference to an application-defining XML document, and iii) event information based on the occurrence of the event; and the event indicator comprising a uniform resource locator (URL) identifying the persistent XML document and a location of the web application, wherein the producing means provides the event indicator to a proxy browser capable of requesting activation of the session of the web application based on the URL.

* * * * *